Jan. 6, 1925.
P. RIEDELE
1,522,144
AUTOMOBILE BUMPER
Filed Nov. 13, 1923
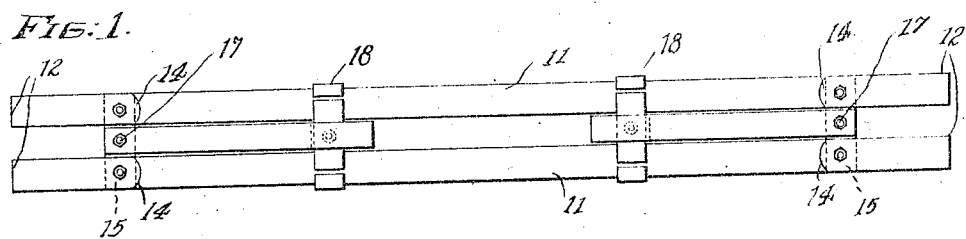
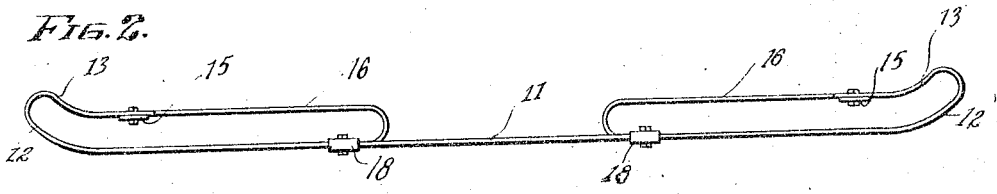
Inventor
PHILIP RIEDELE
By Lyon & Lyon
Attorneys Patented Jan. 6, 1925.

1,522,144

UNITED STATES PATENT OFFICE.

PHILIP RIEDELE, OF LOS ANGELES, CALIFORNIA, ASSIGNOR TO UNITED STATES BUMPER COMPANY, INC., OF LOS ANGELES, CALIFORNIA, A CORPORATION OF CALIFORNIA.

AUTOMOBILE BUMPER.

Application filed November 13, 1923. Serial No. 674,459.

*To all whom it may concern:*

Be it known that I, PHILIP RIEDELE, a citizen of the United States, residing at Los Angeles, in the county of Los Angeles and State of California, have invented a new and useful Automobile Bumper, of which the following is a specification.

This invention relates to resilient automobile bumpers and refers particularly to the resilient bar type of bumpers, which are constructed to be flexible in a horizontal direction and relatively rigid in a vertical direction.

An object of this invention is to provide a resilient bumper of the fore-mentioned type, which will be extremely simple and economical in construction.

Another object of this invention is to provide an automobile bumper of the multiple impact bar type, so constructed that a multiple front impact structure may be supported or carried by a secondary impact structure made separate from the front impact structure and connected thereto at a point to the rear of the front of the bumper structure, to the end that damage of the connections between said front and rear structures will not normally result from impacts or shocks imparted to the bumper.

Another object of this invention is to provide a form of resilient bumper with plurality of vertical aligned resilient loops at the end of the front bumper structure and to support such structure from a secondary impact structure connected to ends of the front structure and further connected or joined to the medial section of the front structure at spaced apart points so as to uniformly reinforce said structure.

Other objects and advantages of this invention will be apparent from a description of the preferred embodiment or methods of embodiment of this invention and will present themselves from the use or practice of the invention. In the accompanying drawing, I have illustrated examples of bar structures embodying the invention, in which—

Figure 1 is a rear view of a modified bumper structure.

Figure 2 is a bottom view of Figure 1.

Referring to the embodiment of the invention shown, there is illustrated a bumper structure comprising two similiar impact bars 11, substantially horizontally disposed and spaced apart vertically, said bars 11 having their opposed ends 12 bent rearwardly and then inwardly and slightly forward as indicated at 13 to form spring loops terminating in ends 14, parallel to the medial section of the bars 11 and spaced rearwardly therefrom. The rear ends of the bars 11 do not converge together, but are each bolted or riveted to a vertically extending plate 15.

The rear impact structure is formed of two complementary and spaced apart bars 16, each having one end bolted or riveted to the plate 15 as indicated at 17, preferably being connected between the ends of the bars 11. From the point 17 the secondary impact bars 16 extend substantially parallel to the front impact bars 11, until about one-sixth of the distance from the center of the bumper structure where said bars are looped forwardly to position their extremities in alignment with the bars 11 and between the same where said extremities are bolted to plates 18, fixed to the bars 11.

By this construction, the rear impact structure is simple, and has the additional advantage of forming with the front bars 11 two spaced apart entirely enclosed loops, which strengthen the front structure against permanent distortion under impact.

In the aforesaid bumper structure all of the bars should be constructed of a resilient metal so that the same may bend or flex under impact, absorbing the shock due thereto, without a permanent distortion of the bumper structure. While the embodiment of the invention herein described is well suited for the purpose of this invention, it is not intended to limit the invention to the specific embodiment described, but various modifications may be made without departing from the spirit of the invention.

This information is of the scope set forth in the appended claim:

I claim:

An automobile bumper comprising a plurality of forward and vertically spaced apart bars having their ends looped rearward then inward and slightly forward, separate secondary impact bars connected to corresponding ends of the forward bars and extending to the rear of the major portion of said bars and parallel thereto, the secondary bars being bent forward to position their ends in alignment with the front bars and spaced apart, and means for clamping the ends to the forward bars.

Signed at Los Angeles, California, this 30th day of October, 1923.

PHILIP RIEDELE.